Feb. 21, 1967  A. SEELIG  3,305,794
CONTROL RECTIFIER INVERTER WITH RESONANT
CIRCUIT AND A CHOKE
Filed Sept. 30, 1964                                 3 Sheets-Sheet 1

Inventor:
Anton Seelig
By: Spencer & Kaye
Attorneys

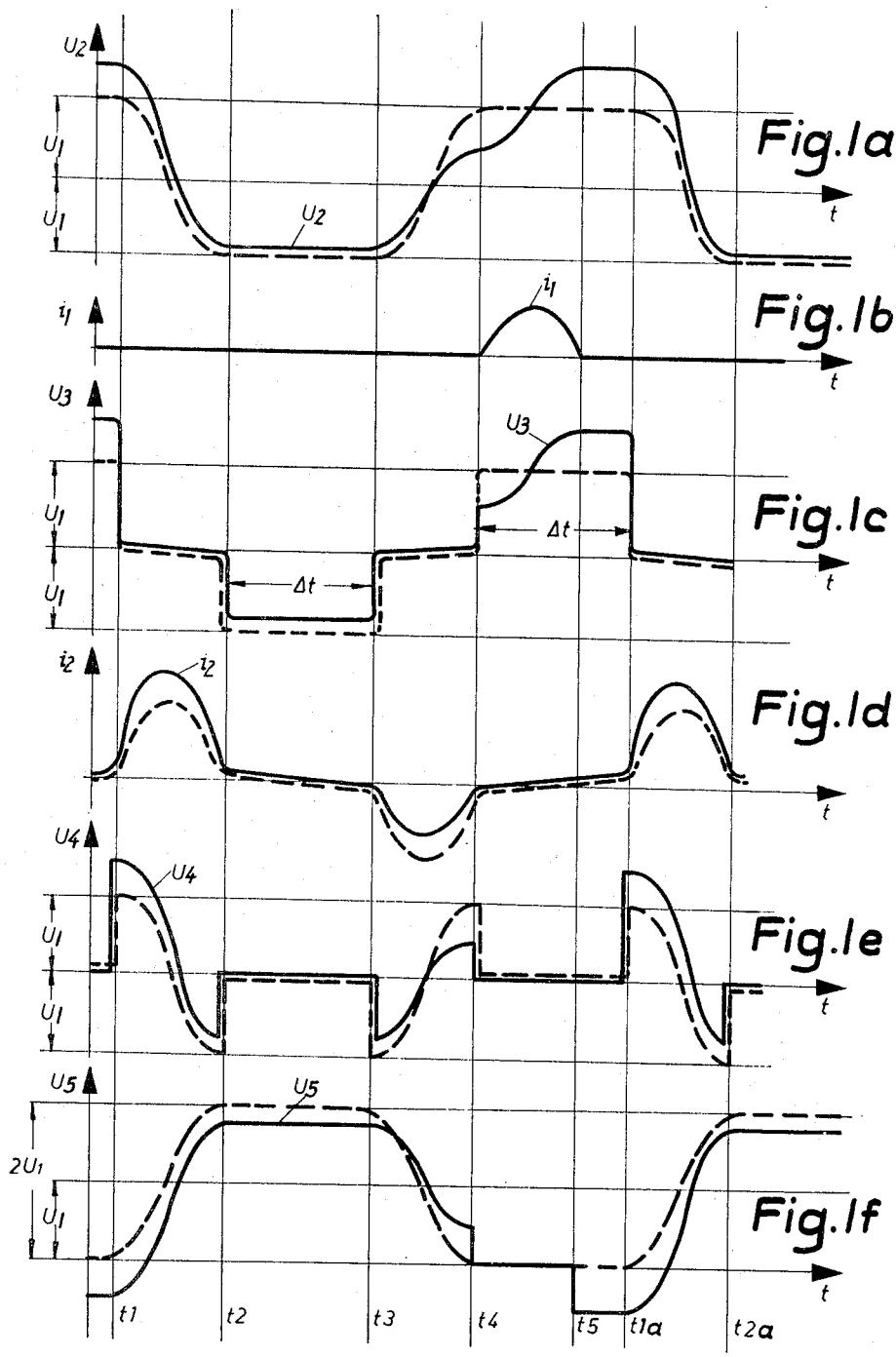

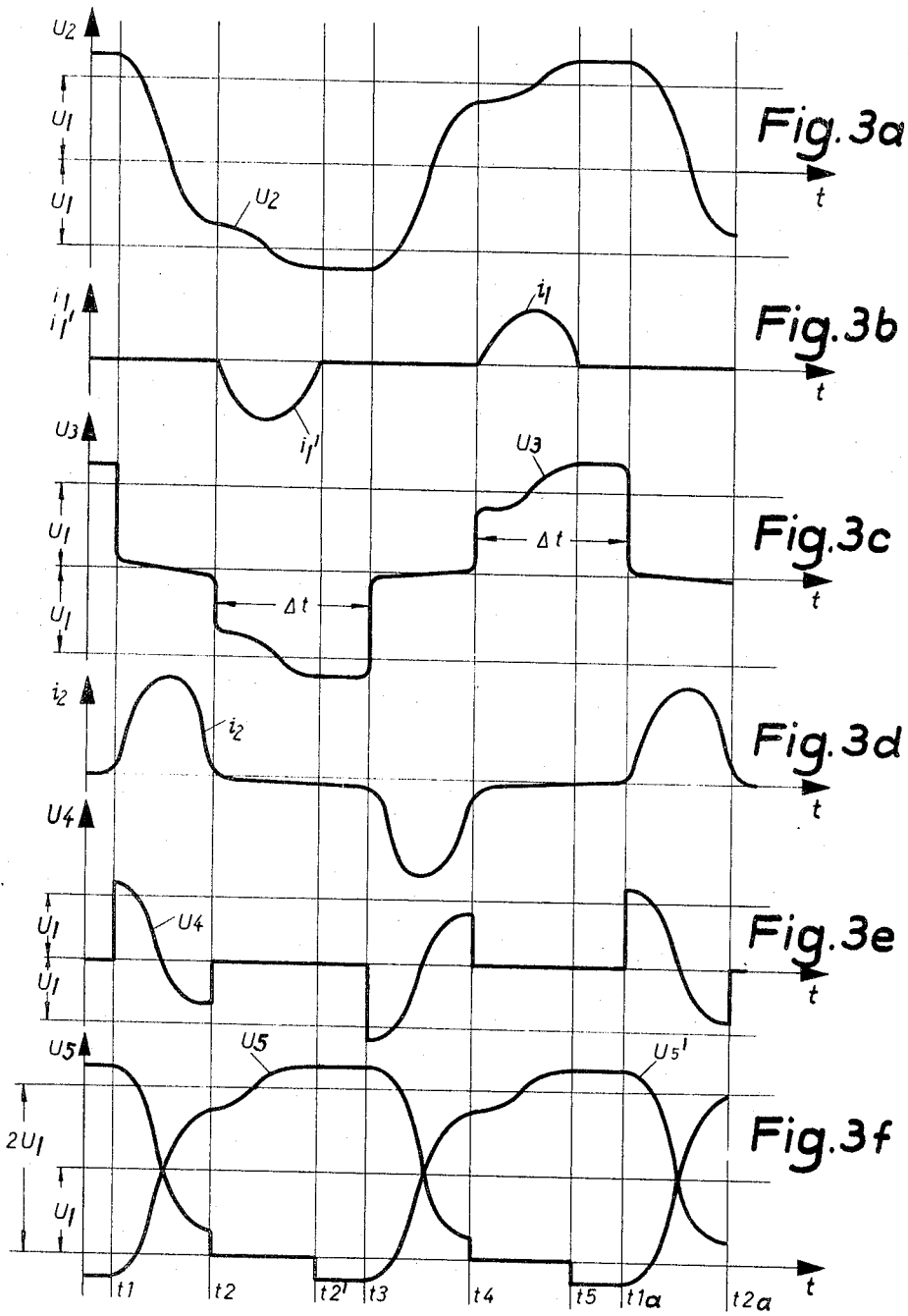

3,305,794
CONTROL RECTIFIER INVERTER WITH RESONANT CIRCUIT AND A CHOKE
Anton Seelig, Weilbach, Germany, assignor to Licentia Patent-Verwaltungs-G.m.b.H., Frankfurt am Main, Germany
Filed Sept. 30, 1964, Ser. No. 400,390
Claims priority, application Germany, Sept. 30, 1963, L 48,984
11 Claims. (Cl. 331—113)

The present invention relates to an inverter, i.e., an inverted converter for producing an A.C. output, especially for changing direct current into alternating current.

More particularly, the present invention resides in an inverter incorporating a resonant circuit.

Considerable difficulties have been encountered in the construction of high-output alternating current sources operating at frequencies above 1 kilocycle. Existing circuit arrangements have been found to possess a number of inherent drawbacks. One type of inverter which has been found suitable for use as a voltage source operating in a frequency range above 1 kilocycle is a circuit incorporating controllable rectifiers by means of which a resonant circuit is periodically triggered. The maximum frequency which can be attained by inverters of this type is fixed by the turn off time of the rectifiers and by the ratio of the minimum duration during which the negative voltage appears across the controllable rectifier immediately after the same has conducted current, to the duration of a complete period or cycle. This ratio is dependent upon the circuit. One particular circuit arrangement has been found in which this relationship is particularly advantageous, this circuit arrangement comprising a transformer having a center-tapered primary winding, the two end terminals of this primary winding being connected, via respective controllable rectifiers, to a direct current source, the center tap being connected, via a capacitor, with a terminal of the direct current source.

While the circuit arrangement last-described above has certain advantages, it nevertheless possesses, as do most inverter circuits using controllable rectifiers, the drawback that the output voltage as well as the voltage needed for rendering the controllable rectifiers non-conductive are, to a very large extent, dependent on the load on the inverter. Thus it is, for example, possible that, in the event the load is suddenly taken off the inverter, the inverter circuit is subjected to large excess voltages which can result in damage or destruction to the controllable rectifiers or which make it necessary to design the circuit in such a manner as to permit the rectifiers, and/or the other circuit components to handle substantially greater loads than the inverter circuit will normally be called upon to handle. If, on the other hand, the circuit is to be so designed as to reduce its dependency on the load, the circuit has to be equipped with expensive monitoring and regulating devices.

There exist still other circuit arrangements which, while they do not suffer from the drawback that they are dependent on the load, are not suited, for various reasons, for operating at higher frequencies.

It is, therefore, the primary object of the present invention to provide an inverter which overcomes the above drawbacks, and, with the above object in view, the present invention resides in a resonant circuit type inverter in which the resonant circuit is self-stabilized in a very simple manner, as a result of which the inverter as a whole will be sufficiently independent of the load to meet the requirements of practical inverters. A particular advantage of the inverter according to the present invention is that the controllable rectifiers will carry only so much current as is determined by the effective power which is fed to the load via the inverter.

More particularly, the present invention resides in a resonant circuit type inverter whose resonant circuit incorporates a capacitance and an inductance as well as a choke, the arrangement being such that during magnetic reversal, i.e., during the time the magnetization of the choke is reversed, one or more controllable rectifiers cause the capacitor to be charged, via one or more inductances, from the voltage source.

Additional objects and advantages of the present invention will become apparent upon consideration of the following description when taken in conjunction with the accompanying drawings in which:

FIGURES 1a, 1b, 1c, 1d, 1e and 1f are graphs showing wave forms of voltages and currents at various points in the circuit of FIGURE 1.

FIGURES 3a, 3b, 3c, 3d, 3e and 3f are graphs showing wave forms of voltages and currents at various points in the circuit of FIGURE 3.

Figure 1:
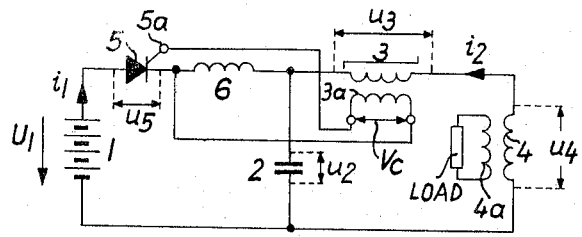
FIGURE 1 is a circuit diagram of one embodiment of an inverter according to the present invention.

Referring now to the drawings and first to FIGURE 1 thereof in particular, the same shows a resonant circuit constituted by a capacitor 2 and an inductance 4, this resonant circuit being energized by a battery or other direct current source 1. The circuit further comprises a reactor 3 having a saturable core, this reactor hereinafter being referred to as a choke. This choke acts as a switch which interrupts the oscillations in the resonant circuit, for a time interval $\Delta t$, every time the resonant circuit current $i_2$ passes through zero. This time interval $\Delta t$ is the time required for the material of which the core of choke 3 is made to undergo magnetic reversal. During this magnetic reversal, in the course of which the magnetization characteristic passes from negative to positive saturation, or vice versa, the inductive voltage drop across the choke and hence its impedance is large. As the choke goes to the saturated condition, the voltage drop decreases as a result of which the inductive reactance falls abruptly to a very low value. Since, during the time the resonant circuit current $i_2$ passes through zero, the entire energy of the resonant circuit is in the electric field of the capacitor 2, the capacitor voltage $u_2$ is at its maximum at the instant of this zero passage, this voltage thus being a measure of the total resonant circuit energy. The voltage across the capacitor can have two different directions with respect to the voltage $U_1$ of the D.C. source, that is to say, the voltage across the capacitor can either be in the same direction as the battery voltage or it can be opposed thereto. If, at an instant at which the capacitor voltage $u_2$ is opposed to the battery voltage $U_1$ and the choke has interrupted the oscillations in the resonant circuit, a short firing pulse is applied to a controlled rectifier 5, which together with a charging inductance 6 forms a series-circuit connected between the power supply 1 and the capacitor 2, this rectifier "fires," i.e., becomes conductive, only if the capacitor voltage $u_2$ is smaller by a certain amount than the driving voltage $U_1$. In that event, oscillations will start in the resonant circuit formed by the charging inductance 6 and the capacitor 2, in the course of which the capacitor is charged to a voltage which is greater than the battery voltage $U_1$.

Energy, i.e., output power, can be taken out of the inverter according to the present invention by damping the resonant circuit formed by the inductance 4 and the capacitor 2. For instance, the inductance 4 can be constituted by the primary winding of a transformer whose secondary winding, shown at 4a, is connectible to the load. Alternatively, the inductance 4 or the capacitor 2 itself may constitute the load.

The voltages which arise during the magnetic reversal of the choke 3 and whose direction is predetermined, can be used to advantage for firing or turning on the controlled rectifier 5. A simple way of doing this is by using a secondary winding which is wound on the core of the choke. Such a secondary winding is shown, in FIGURE 1, at 3a, the control voltage being indicated at $V_C$.

The polarity of the control voltage $V_C$ is so selected that there is applied to the controllable rectifier a voltage pulse which turns on the rectifier only if the magnetic reversal of the core of the choke takes place in the right direction. Magnetic reversal in the opposite direction results in a pulse of the opposite polarity, which does not turn the rectifier on.

The voltage and current relationships are shown in FIGURES 1a through 1f, the charging current of the capacitor 2 via the controlled rectifier 5 being shown at $i_1$, the resonant circuit current at $i_2$, the voltage across the capacitor at $u_2$, the voltage across the choke 3 at $u_3$, the voltage across the resonant circuit inductance 4 at $u_4$, and the voltage across the controlled rectifier 5 at $u_5$. The wave forms shown in full lines represent the conditions prevailing when the inverter operates under load while the wave forms shown in dashed lines represent the conditions prevailing when the inverter operates under no-load.

To facilitate understanding of the wave forms shown in FIGURES 1a through 1f, it is assumed that the resonant circuit has passed the transient conditions. At the instant $t_1$, the voltage $u_2$ (FIGURE 1a) across capacitor 2—which, prior to the instant $t_1$, was charged up, via the controlled rectifier 5, by the current $i_1$ (not shown, at that point of time, in FIGURE 1b)—should be at its maximum, the upper electrode, i.e., the plate, of the capacitor (as viewed in FIGURE 1) being positive with respect to the lower plate. The core of the choke 3 underwent magnetic reversal immediately prior to instant $t_1$ and becomes saturated at instant $t_1$. As a result of this, the impedance of the choke effectively disappears, as does the voltage $u_3$ across the choke (FIGURE 1c), so that a current $i_2$ (FIGURE 1d) can flow during the time interval between instants $t_1$ and $t_2$. During this time interval, the charge on the capacitor is changed over, with the negative voltage reaching its maximum at instant $t_2$. The lower plate of the capacitor 2 is then positive with respect to the upper plate. However, due to the damping of the resonant circuit, the maximum negative value is smaller than the positive maximum value. The voltage $u_4$ (FIGURE 1e) across the inductance 4 changes its polarity during the time interval between instants $t_1$ and $t_2$, as does the voltage $u_5$ (FIGURE 1f) across the controlled rectifier 5 which, at instant $t_2$, is subjected to the maximum forward voltage. At the instant $t_2$, the choke 3 comes out of its saturated condition, whereupon it represents a large impedance and prevents the flow of the resonant circuit current $i_2$ until the instant $t_3$ at which time the choke becomes saturated in opposite polarity. During the magnetic reversal time $\Delta t$, the choke has, for all practical purposes, disconnected the load from the capacitor, whose charge remains unchanged. Beginning at instant $t_3$, the resonant circuit current $i_2$ can once again flow, in opposite direction, thereby changing the charge on the capacitor 2, i.e., the upper plate of the capacitor 2 once more becomes positive with respect to the lower plate. At instant $t_4$, the rectifier 5 is fired by a forward voltage. A control voltage pulse $V_C$ is induced in the secondary winding 3a of the choke, when the primary voltage $u_3$ thereof increases steeply, due to the onsetting magnetic reversal, at $t_4$. A sinusoidal current $i_1$ will then flow in the charging circuit, consisting of the charging inductance 6 and the capacitor 2, until instant $t_5$.

The capacitor is charged by the current $i_1$ to its initial voltage, the upper plate of the capacitor becoming positive with respect to the lower plate. At the same time, the core of the choke undergoes magnetic reversal so that this choke starts to block the flow of current. In this way, the choke prevents the flow of the resonant circuit current $i_2$ during the charging of the capacitor 2. After the charging current $i_1$ has become zero, at instant $t_5$, the controlled rectifier 5 requires a certain so-called turn-off time until it can once more take up the full forward voltage. During this turn-off time, the capacitor voltage $u_2$ must under no circumstances drop below the battery voltage $U_1$. In the inverter according to the present invention, the dropping of the capacitor voltage $u_2$ immediately after the controlled rectifier has passed current, is prevented by making the magnetic reversal time $\Delta t$ of the choke greater than the half-wave width $t_4$ to $t_5$ of the capacitor charging current $i_1$. Consequently, the choke continues to keep the capacitor 2 disconnected from the resonant circuit inductance 4 even for a short period of time after the capacitor has been charged up. The small magnetizing current which flows through the choke during the magnetic reversal time has no effect in the wave shape of the capacitor voltage. After the choke has completed its magnetic reversal at $t_{1a}$, the core material is saturated, the choke establishes a connection between the inductance 4 and the capacitor 2, and the resonance in this circuit is determined by the capacitance of capacitor 2, the resonant circuit inductance 4 and inductive load coupled thereto. A new resonant cycle has thus started at instant $t_{1a}$.

The charge changing current $i_2$ is virtually sinusoidal, the wave form being determined, essentially, by the capacitance of capacitor 2 and by the inductance 4.

Figure 2:
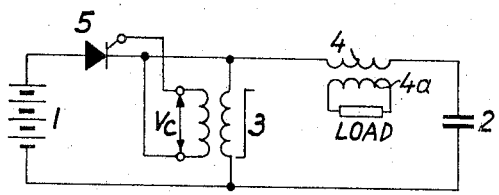
FIGURE 2 is a circuit diagram of another embodiment of an inverter according to the present invention.

The circuit of FIGURE 2 differs from that of FIGURE 1 in that the choke is so positioned that the separate charging inductance 6 can be dispensed with. Instead, the inductance 4 is made to serve as both the resonant circuit inductance as well as the charging inductance. Other than that, the circuit functions similarly to the manner described above in connection with FIGURE 1. The capacitor 2 is charged up via the controlled rectifier 5 and the inductance 4. During this time, the core of the choke undergoes magnetic reversal so that the choke blocks the flow of current. After the charging current has dropped to zero, the upper plate of the capacitor 2, as viewed in FIGURE 2, is positive with respect to the lower plate. If the core of the choke has become saturated, the choke loses the greatest part of its impedance so that current can flow through the resonant circuit, this current changing the charge on the capacitor 2. After a certain time interval $\Delta t$, during which the core of the choke again undergoes magnetic reversal, current flows through the resonant circuit in the opposite direction, this current changing the charge on the capacitor back to that which it was originally. Firing the controlled rectifier 5 causes the capacitor 2 to be charged up to its original potential once more, this being brought about by a charging current put out from the battery 1, thereby to make up the losses which resulted from the damping of the resonant circuit.

Figure 3:
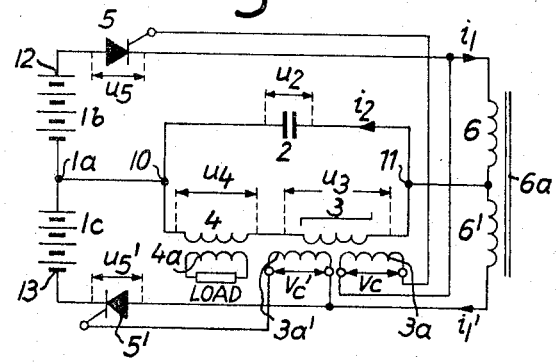
FIGURE 3 is a circuit diagram of a third embodiment of an inverter according to the present invention.

As is apparent from FIGURES 1a through 1f, the use of a single controlled rectifier 5 results in different positive and negative amplitudes of the capacitor voltage $u_2$. For this reason the positive and negative amplitudes of the resonant circuit current $i_2$ are also different. In practice, however, it is desirable that the charging current have symmetrical positive and negative half-waves, and this result is accomplished by utilizing two controlled rectifiers, as shown in the circuit of FIGURE 3 which incorporates a D.C. source having two halves 1b and 1c and a center tap 1a. The terminals 12 and 13 of the D.C. source are connected, via two controlled rectifiers 5 and 5' and the two windings 6 and 6' of a tapped inductance 6 having a core 6a, to the terminals 10 and 11 of resonant circuit, the latter comprising capacitor 2 connected in parallel with a series circuit consisting of inductance 4 and choke 3. The function of the circuit of FIGURE 3 will be explained in conjunction with FIGURES 3a through 3f, in which $i_2$ again represents the resonant circuit current, $i_1$ and $i_1'$ represent the charging currents through the two controlled rectifiers 5 and 5', respectively, $u_2$ represents the voltage across capacitor 2, $u_3$ represents the votlage across choke 3, $u_4$ represents the voltage across the inductance 4, and $u_5$ and $u_5'$ represent the voltages across the controlled rectifiers 5 and 5', respectively.

At the instant $t_1$, the voltage $u_2$ across the capacitor 2 is once more at its maximum, the right plate of the capacitor, as viewed in FIGURE 3, being positive with respect to the left plate, while the voltage $u_3$ across the choke 3 becomes zero at this moment due to the saturation of the core. A resonant circuit current $i_2$ can then again flow during the time interval $t_1$-$t_2$ since the core of the choke becomes unsaturated and the voltage drop across the choke begins to rise. The charge on the capacitor became changed as a result of this resonant circuit current so that now the left plate is positive with respect to the right plate. A control voltage pulse $V_{C'}$ is induced in the secondary winding 3a' of the choke at instant $t_2$, this pulse being dependent on the voltage increase across the choke 3. This voltage pulse fires the controlled rectifier 5' so that during the time interval $t_2$-$t_{2'}$, a charging current $i_{1'}$ can flow from the tap 1a of the voltage source via the controlled rectifier 5' to the terminal 13. This charging current charges the capacitor 2 back up to its original voltage, which, however, is of the opposite polarity, this being in contradistinction to the wave forms associated with the circuit of FIGURE 1. Since the charging current has dropped to zero at instant $t_{2'}$, the choke 3 prevents the flow of any resonant circuit current until the instant $t_3$, so that the controlled rectifier 5' once more becomes non-conductive. When the core of the choke again becomes saturated, at instant $t_3$, the resonant circuit current $i_2$ flows in the opposite direction which changes the charge on the capacitor 2 so that now the right plate of the capacitor 2 once more becomes positive with respect to the left plate. The current $i_2$ is interrupted at the instant $t_4$ at which the core of the choke 3 ceases to be saturated and undergoes magnetic reversal, at which instant a control pulse $V_C$ is produced in the secondary winding 3a, this control pulse firing the controlled rectifier 5. A charging current $i_1$ can now flow, until instant $t_5$, through the controlled rectifier 5, and this charges the capacitor 2 back up to its original voltage, with the original polarity. During the time interval $t_5$-$t_{1a}$, the controlled rectifier 5, after the cessation of the charging current $i_1$, once more becomes non-conductive, so that, inasmuch as the core of the choke has again become saturated at instant $t_{1a}$, a new cycle starts with the flow of the resonant circuit current $i_2$.

The maximum frequency at which heretofore conventional resonant circuit type inverters could operate is limited by the turn-off time of the rectifiers. It will be appreciated from the above that this limitation does not apply to the inverter according to the present invention, because the interrupted resonant circuit current $i_2$ results in very pronounced harmonics, particularly harmonics having a frequency three times that of the fundamental. Even though the fundamental is limited by the turn-off time of the controlled rectifier, the inverter according to the present invention can be used to produce currents of higher frequencies, particularly currents having three times the frequency of the fundamental.

In practice, the choke 3, which in unsaturated condition has a substantially greater inductance than the inductance through which the capacitor is charged and in saturated condition has an inductance which is substantially smaller, has a generally rectangular magnetization characteristic.

It will be understood that the above description of the present invention is susceptible to various modifications, changes and adaptations, and the same are intended to be comprehended within the meaning and range of equivalents of the appended claims.

What is claimed is:

1. An inverter comprising, in combination: a resonant circuit having a capacitor, a resonant circuit inductance, and a choke; and circuit means connecting said resonant circuit to a power supply and including at least one controlled rectifier for periodically charging said capacitor; said choke being a means for preventing the flow of current between said capacitor and said inductance during the periodic magnetic reversals which said choke undergoes while said capacitor is charged by the power supply via said controlled rectifier.

2. An inverter as defined in claim 1 wherein said choke is saturable and, in unsaturated condition, has an inductance which is substantially greater than that of the inductance through which the capacitor is charged, and in saturated condition an inductance which is substantially smaller than said resonant circuit inductance.

3. An inverter as defined in claim 2 wherein said choke has a generally rectangular magnetization characteristic.

4. An inverter as defined in claim 1 wherein said circuit means include a charging inductance which is in series with said rectifier.

5. An inverter as defined in claim 1 wherein said resonant circuit is connected with said circuit means such that said resonant circuit inductance is in series with said capacitor and said rectifier and thus serves as the inductance via which said capacitor is charged.

6. An inverter as defined in claim 1 wherein said circuit means include a power supply having a center tap, wherein one terminal of said resonant circuit is connected with said center tap, and wherein said circuit means include two rectifiers and two charging inductances, one of said rectifiers and one of said charging inductances being connected in series between the other terminal of said resonant circuit and one end terminal of said power supply and the other of said rectifiers and the other of said charging inductances being connected in series between said other terminal of said resonant circuit and the other end terminal of said power supply.

7. An inverter as defined in claim 6 wherein said two charging inductances are magnetically coupled with each other.

8. An inverter as defined in claim 1 wherein said rectifier has a control electrode, and wherein means are provided for producing a voltage which is a function of the voltage across said choke, said last-mentioned means being connected to said control electrode of said rectifier.

9. A circuit arrangement as defined in claim 1 wherein said resonant circuit inductance constitutes at least part of the load.

10. An inverter as defined in claim 1 wherein said resonant circuit inductance is constituted by the primary winding of a transformer, and wherein the load is connectible to the secondary winding of said transformer.

11. An inverter comprising, in combination:
 (a) a resonant circuit incorporating at least one capacitor and one inductance which is at least a part of a load;
 (b) at least one controlled rectifier connecting said resonant circuit to a power supply for periodically charging said capacitor; and
 (c) a choke connected in circuit with said capacitor and the load for preventing the flow of current between said capacitor and the load, while said capacitor is being charged from the power supply, during the times said choke undergoes magnetic reversal.

References Cited by the Examiner

UNITED STATES PATENTS

| | | | |
|---|---|---|---|
| 2,732,499 | 1/1956 | Bunblasky et al. | 331—128 |
| 2,929,013 | 3/1960 | McNamee | 331—128 |
| 3,034,015 | 5/1962 | Schultz | 331—113 |
| 3,089,965 | 5/1963 | Krezek | 307—88.5 |
| 3,181,071 | 4/1965 | Smith et al. | 307—88.5 |

UNITED STATES PATENTS

| | | |
|---|---|---|
| 222,228 | 7/1962 | Austria. |

ROY LAKE, *Primary Examiner.*

J. KOMINSKI, *Assistant Examiner.*

UNITED STATES PATENT OFFICE
CERTIFICATE OF CORRECTION

Patent No. 3,305,794                 February 21, 1967

Anton Seelig

It is hereby certified that error appears in the above numbered patent requiring correction and that the said Letters Patent should read as corrected below.

In the heading to the printed specification, line 9, for "L 48,984" read -- L 45,984 --; column 1, line 34, for "center-tapered" read -- center-tapped --.

Signed and sealed this 26th day of September 1967.

(SEAL)
Attest:

ERNEST W. SWIDER                 EDWARD J. BRENNER
Attesting Officer                 Commissioner of Patents